United States Patent
Garg et al.

(10) Patent No.: US 6,842,177 B2
(45) Date of Patent: Jan. 11, 2005

(54) MACROBLOCK PADDING

(75) Inventors: Rohit Garg, Seattle, WA (US); Chris Yoochang Chung, Lynnwood, WA (US); Coskun Mermer, Mountlake Terrace, WA (US); Donglok Kim, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 304 days.

(21) Appl. No.: 10/020,684

(22) Filed: Dec. 14, 2001

(65) Prior Publication Data

US 2003/0112243 A1 Jun. 19, 2003

(51) Int. Cl.$^7$ ................................. G06T 11/20
(52) U.S. Cl. .................. 345/441; 345/582; 345/592; 345/503
(58) Field of Search ................. 345/555, 582, 345/592, 501–503, 441, 552, 520; 382/166, 242–244

(56) References Cited

U.S. PATENT DOCUMENTS

| | | | | |
|---|---|---|---|---|
| 5,768,537 A | * | 6/1998 | Butter et al. | 709/247 |
| 5,881,175 A | * | 3/1999 | Kim | 382/242 |
| 6,034,690 A | * | 3/2000 | Gallery et al. | 345/419 |
| 6,071,193 A | * | 6/2000 | Suzuoki | 463/31 |
| 6,154,570 A | * | 11/2000 | Boon | 382/236 |
| 6,208,693 B1 | * | 3/2001 | Chen et al. | 375/240.24 |
| 6,421,058 B2 | * | 7/2002 | Parikh et al. | 345/522 |
| 6,577,769 B1 | * | 6/2003 | Kenyon et al. | 382/239 |
| 6,625,212 B1 | * | 9/2003 | Chen et al. | 375/240.08 |
| 6,636,644 B1 | * | 10/2003 | Itokawa | 382/243 |

* cited by examiner

Primary Examiner—Kee M. Tung
Assistant Examiner—Po-Wei Chen
(74) Attorney, Agent, or Firm—Ronald M. Anderson

(57) ABSTRACT

A boundary macroblock of a video object is padded without significant synchronization overhead between a host processor and an existing coprocessor. The host processor determines horizontal and vertical graphics primitives as a function of shape data stored in a host memory. The shape data determine whether a dot, a line, or a rectangle primitive should be used to pad transparent pixels in the macroblock. The host processor communicates the primitives to a coprocessor, which renders the primitives in an interleaved pipeline fashion to pad transparent pixels of the macroblock based on texture data stored in video memory. The flow of primitives is in one direction from the host processor to the graphics coprocessor, and the texture data is not transferred back and forth between the host processor and coprocessor. This technique is especially useful for enabling acceleration of MPEG-4 video decoding utilizing existing coprocessors capable of accelerating MPEG-1/2 video decoding.

20 Claims, 9 Drawing Sheets

MACROBLOCK PADDING

FIELD OF THE INVENTION

The present invention is generally directed to a system and method for padding macro blocks on and outside a shape boundary of a video object, and more specifically, to an algorithm for performing horizontal and vertical processing to pad macro blocks around a video object of Motion Picture Experts Group Version 4(MPEG-4) video data.

BACKGROUND OF THE INVENTION

The MPEG standards specify a lossy type compression scheme that is adapted to handle a variety of audio/video formats. MPEG-1 and MPEG-2 employ frame-based coding standards that are beneficial for primarily single-media video applications. For example, MPEG-2 (i.e., MPEG Version 2) supports standard television signals, high definition television (HDTV) signals, and five channel surround sound. Similarly, MPEG-2 also provides a broadcast-quality image at 720×480 pixel resolution for use in digital video disk (DVD) movies.

The latest video coding standard, MPEG-4, supports object-based compression/decompression that is beneficial for multimedia applications, especially combining natural video and synthetic graphics objects. MPEG-4 is capable of relatively high compression ratios and is a powerful tool useful for a wide range of applications, including Internet browsing, set-top boxes, video games, video conferencing, and wireless networks. Also, the MPEG-4 standard is capable of handling arbitrary-shaped objects that cannot be accommodated by the frame-based coding standards of both MPEG-1 and MPEG-2.

Widespread use of MPEG-4 for desktop video is expected, but MPEG-4 acceleration is not widely incorporated into many graphics coprocessors. Fortunately, the techniques used in MPEG-4 video decoding for rectangular video objects is similar to those used in MPEG-2. Thus, MPEG-4 video decoding can be accelerated in a similar way on existing graphics coprocessors, such as Nvidia Corporation's GEFORCE™ graphics coprocessor, S3 Graphic, Inc.'s SAVAGE™ line of graphics coprocessors, ATI Technology, Inc.'s RAGE™ line of graphics coprocessors, and Rendition Corporation's VERITE™ series of graphics coprocessors.

These graphics coprocessors typically accelerate MPEG-1/2 decoding with separate on-chip fixed function units or programmable/configurable graphics pipelines. These pipelines often perform the last few steps of MPEG-1/2 decoding rather than requiring the host processor to perform these steps. Examples of off-loaded tasks performed by the graphics coprocessors include motion compensation and inverse discrete cosine transformation (IDCT). The last few steps of MPEG-1/2 decoding has a one-way data flow (from the host processor to the coprocessor), thus avoiding the need for synchronization between the host processor and the coprocessor.

However, if the host processor needs to post-process the resulting macroblocks after an IDCT and motion compensation, the coprocessor must notify the host processor when the IDCT or motion compensation is completed and the data are ready to be transferred back to the host processor. This process has to be repeated in transferring the post-processed data back to the coprocessor's video memory.

For example, the padding of boundary macroblocks has to be done on texture data after IDCT and motion compensation are completed. For padding to be performed by the host processor, macroblocks have to be transferred from video memory to host memory for padding and then back to video memory for use as a reference in decoding subsequent frames. Unfortunately, boundary macroblock padding, which is one of the key processing steps in decoding arbitrary-shaped video objects in MPEG-4, cannot be efficiently accelerated on typical graphics coprocessors. Unless special hardware and/or a specific set of new instructions are added to the graphics coprocessor, it is typically better for boundary macroblock padding to be performed on the host processor.

Rather than incurring the processing load on the host processor, and taking the time to pass data back and forth between host memory and video memory, it would clearly be desirable to accelerate MPEG-4 video decoding on the same processing hardware used for MPEG-2 video decoding by implementing boundary macroblock padding more efficiently. Accordingly, it would be preferable to develop a solution that can be readily implemented with existing hardware and without significant synchronization overhead.

SUMMARY OF THE INVENTION

The present invention is directed to a method for padding a boundary macroblock of a video object without significant synchronization overhead between a host processor and an existing coprocessor, and without redundant transfer of data between a host memory and a video memory. The host processor determines horizontal and vertical graphics primitives as a function of object shape data stored in the host memory and communicates the primitives to the coprocessor, which renders the primitives in an interleaved pipeline fashion to pad the macroblock based on texture data stored in video memory. The flow of primitives is in one direction from the host processor to the coprocessor, and the texture data need not be transferred back and forth between the host processor and coprocessor.

More specifically, the host processor performs a row-by-row horizontal scan of a macroblock to count pixels in each row that lie outside the boundary of the video object (these pixels are referred to as transparent pixels). The host processor determines a horizontal primitive for each set of transparent pixels in a row. Any row comprised entirely of transparent pixels is flagged for processing during a subsequent horizontal scan. The host processor communicates the horizontal primitives to the coprocessor. The coprocessor can then immediately use the horizontal primitives and texture data stored in video memory to begin horizontal padding of the macroblock.

While the coprocessor is doing the horizontal padding, the host processor performs a vertical scan of a stack indicating rows that were flagged as being comprised entirely of transparent pixels. The host processor determines a vertical primitive for each set of flagged rows. After the lapse of a latency period that enables the coprocessor to complete the horizontal padding, the host processor communicates the vertical primitives to the coprocessor. The coprocessor uses the vertical primitives and texture data resulting from the horizontal padding to perform vertical padding of the macroblock.

Other aspects of the present invention are directed to a system for padding a boundary macroblock of a video object and to a machine-readable medium storing machine instructions that cause a processor to generally perform the steps of the method discussed above. The system includes a host processor, a host memory in communication with the host processor, a coprocessor in communication with the host processor; a graphics memory in communication with the coprocessor, a data bus in communication with the host processor and coprocessor, and optionally a buffer. These components carry out functions generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

In MPEG-4, each instance of a video object is called a VOP (sometimes referred to as simply a video object) and when applying this standard, a bitstream that contains VOPs of arbitrary shape, a bounding rectangle confining each VOP and a shape for the VOP must be decoded. IDCT and motion compensation are then performed for macroblocks in the bounding rectangle. During encoding, the macroblocks on and outside the shape boundary are padded to decrease the error values in motion prediction. Accordingly, during decoding, the pixels on and outside the shape boundary should be padded for correct motion compensation.

Figure 1:
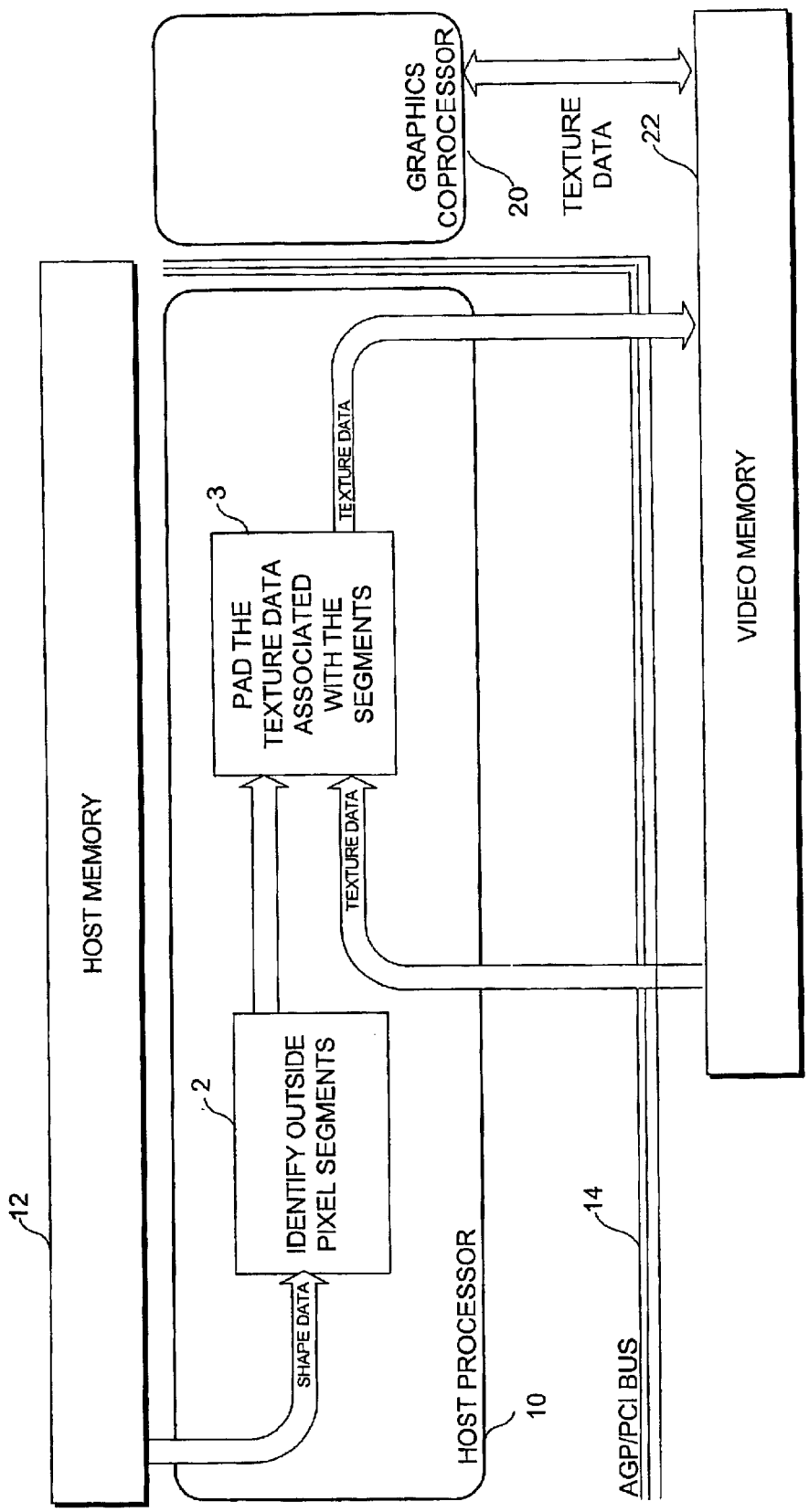
FIG. 1 (prior art) is a schematic functional block diagram illustrating a conventional architecture for padding source texture data.

FIG. 1 is a schematic functional block diagram illustrating a prior art architecture for padding source texture data associated with pixels that lie outside the boundary of a video object. In this prior art architecture, a host processor 10 performs the padding. Host processor 10 is generally disposed on a mother board and obtains VOP shape data from a host memory 12, which is generally also disposed on the mother board. Host processor 10 uses the shape data to identify segments of pixels that lie outside the boundary of the VOP, as shown by a block 2. Each pixel lying outside the boundary of the VOP is considered a transparent pixel. As shown by a block 3, host processor 10 obtains texture data from a video memory 22, which is typically disposed on a separate video graphics card that drives a display. To transfer the texture data between the video card and the mother board, the texture data typically passes from video memory 22 to host processor 10 via a bus 14, such as an accelerated graphics port (AGP) bus, a peripheral component interconnect (PCI) bus, or other conventional bus. This transfer requires overhead in processing load to achieve synchronization between host processor 10 and a graphics coprocessor 20 that is disposed on the video graphics board, and which typically controls data on the video graphics board.

Host processor 10 determines the portions of the texture data that correspond to the segments of pixels lying outside the boundary of the VOP and pads the texture data corresponding to the pixel segments that lie outside the boundary of the VOP. The texture data corresponding to these pixel segments that are outside the boundary are padded with texture data associated with adjacent VOP boundary pixels or with an average of texture data associated with surrounding VOP boundary pixels. The entire padded texture data are next transferred back to video memory 22 over bus 14, again with the necessary overhead required for synchronization. The padded texture data are then available to graphics coprocessor 20 for further processing.

Reading the entire texture data from video memory and transferring the texture data over the bus to the host processor requires a substantial amount of time and bandwidth. Moreover, retransferring the entire padded texture data back from the host processor to the video memory over the bus further increases the time and load on the system. Even in the case of a few video objects with moderate size, the overhead required for synchronization between the host processor and the graphics coprocessor to transfer the data across bus 14 will reduce the overall performance significantly.

An important characteristic of modem graphics coprocessors is their ability to work asynchronously relative to the host processor. An asynchronous and independent architecture is designed to achieve the maximum utilization of both the host processor and the graphics coprocessor, which would not be possible if "lock-step" handshaking were required between the two. When an asynchronous architecture is utilized, the host processor sends commands or data to the graphics coprocessor asynchronously, which enables pipelined processing. These commands or data can be graphics primitives, macroblocks for IDCT, motion compensation, etc. While the graphics coprocessor is rendering a current frame, the host processor starts processing 2–3 future frames.

Introducing any operation requiring synchronization into the asynchronous interaction between the host processor and graphics coprocessor, such as transferring data that has been modified by the graphics coprocessor back to the host processor, results in breaking down the pipeline and flushing all of the commands that were issued to the graphics coprocessor by the host processor. This flushing of commands is very inefficient because the host processor will remain idle, waiting for the flushing to be completed. After the commands have been flushed, the graphics coprocessor will be idle until the host processor can send a new set of commands to the graphics coprocessor. These delays and the inactivity of the two devices defeat the purpose of an asynchronous architecture in which the host processor and the graphics coprocessor can work independently. The flushing of commands that is necessary for synchronization is employed in the prior art architecture described above. Clearly, it would be desirable to minimize or eliminate any need for synchronization, and ensure that the data flow is unidirectional, from the host processor to the graphics coprocessor.

Figure 2:
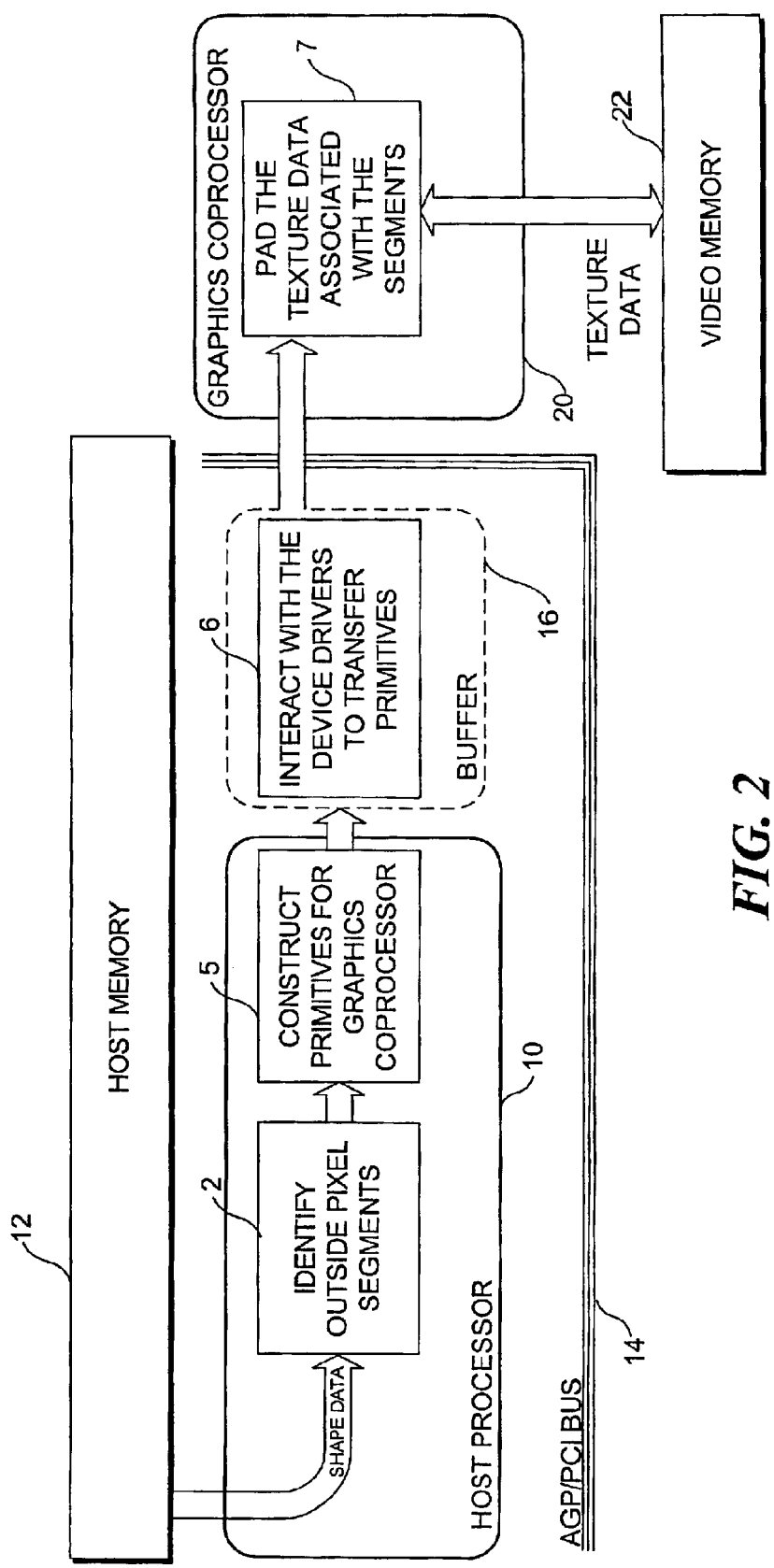
FIG. 2 is a schematic functional block diagram illustrating a preferred embodiment of an architecture for padding source texture data in accord with the present invention.

FIG. 2 is a schematic functional block diagram illustrating a preferred embodiment of an architecture for padding source texture data in accord with the present invention. Instead of twice transferring the entire texture data between the host and graphics coprocessor so that host processor 10 can be used for padding, graphics coprocessor 20 performs the padding on the video board by executing a small set of padding commands in the form of graphic primitives that are received from host processor 10. Thus, only the primitives are transferred, only a single time over bus 14, and in one direction, thereby reducing the time and bandwidth needed for padding, and allowing asynchronous processing by host processor 10 and graphics coprocessor 20 to continue without the interruption incurred to pass data synchronously.

Specifically, host processor 10 obtains the shape data from host memory 12 as above. Host processor 10 again uses the shape data to identify segments of pixels outside the boundary of the VOP, as again shown by block 2. However, instead of next reading the texture data from video memory 22 over bus 14, host processor 10 constructs primitives to be issued to graphics coprocessor 20, as shown by a block 5. As shown by a block 6, host processor 10 then optionally uses a buffer 16 to interact with a video card device driver to transfer the primitives to graphics coprocessor 20 over bus 14. Graphics coprocessor 20 directly obtains the texture data from video memory 22, and locally performs the padding on the texture data according to the primitives. Graphics coprocessor 20 then transfers the padded texture data back to video memory 22, without ever needing to transmit the texture data over bus 14.

Figure 3:
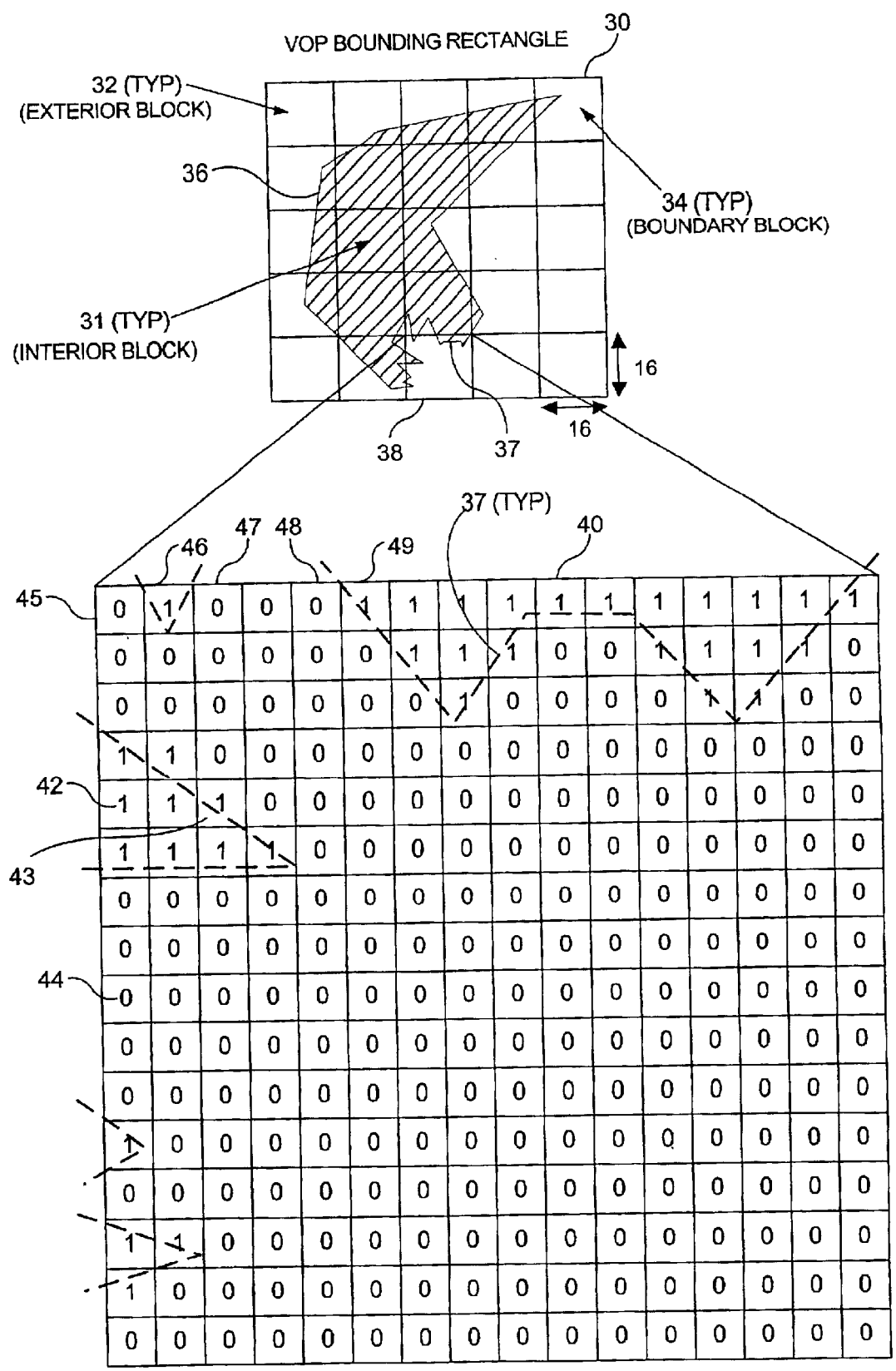
FIG. 3 is an exemplary video object plane (VOP) bounding rectangle of macroblocks enclosing a video object and the shape data for a portion of the video object.

FIG. 3 illustrates a VOP bounding rectangle 30 of macroblocks enclosing a video object 36. Each macroblock preferably comprises 16 by 16 pixels, although those skilled in the art will recognize that other size macroblocks may be processed in accord with the present invention. There are three types of macroblocks. One type of macroblock is an interior block 31 that is completely within a boundary 37 of video object 36. Interior blocks do not need to be padded, because all of the texture data associated with an interior block is within the boundary of the video object. Another type of macroblock is an exterior block 32 that includes no portion of video object 36, but is needed to complete VOP bounding rectangle 30 around video object 36. An exterior block is padded with texture values from an adjacent block, since exterior blocks fall entirely outside boundary 37 of video object 36. The third type of macroblock is a boundary block 34, which includes some portion of video object 36 and some transparent portion outside boundary 37 of video object 36.

A boundary block 38 illustrates a complex portion of boundary 37 for purposes of the discussion that follows. Shape data 40 for the 16 by 16 pixels of boundary block 38 are also shown in FIG. 3. Within shape data 40, portions of boundary 37 are shown as dashed lines. The shape data for pixels within video object 36, or on boundary 37, such as a pixel 42 have a binary value equal to one. Pixels within video object 36 are sometimes referred to as opaque pixels. Opaque pixels are associated with a specific texture value in the texture data for the macroblock. The shape data for pixels outside boundary 37 of video object 36, such as pixel 44, have a binary value equal to zero. As noted above, pixels outside boundary 37 of video object 36 are often referred to as transparent pixels.

A transparent pixel corresponds to a portion of the texture data that must be padded with a value related to the texture data of one or more nearby pixels. For example, the portion of the texture data associated with a transparent pixel 45 in the upper left corner of shape data 40 is padded with the same value as the texture data associated with an opaque pixel 46. This padding step can be accomplished with a command issued to the graphics coprocessor to employ a dot primitive at pixel 45 to provide pixel 45 with the texture value of pixel 46. Transparent pixels 47 through 48 are padded with an average value of the texture data of opaque pixels 46 and 49. This step can be accomplished by issuing a command to the graphics coprocessor to employ a horizontal line primitive extending between pixels 47 through 48 to provide them with the average value of the texture data of opaque pixels 46 and 49. Similarly, transparent pixel 44 can be padded by employing a line primitive that applies the average of the texture data for the nearest opaque value above pixel 44 and for the nearest opaque value below pixel 44. This second line primitive is employed during a vertical processing step, so is referred to as a line-v primitive to distinguish it from the other line primitive referred to as the horizontal line primitive.

Figure 4:
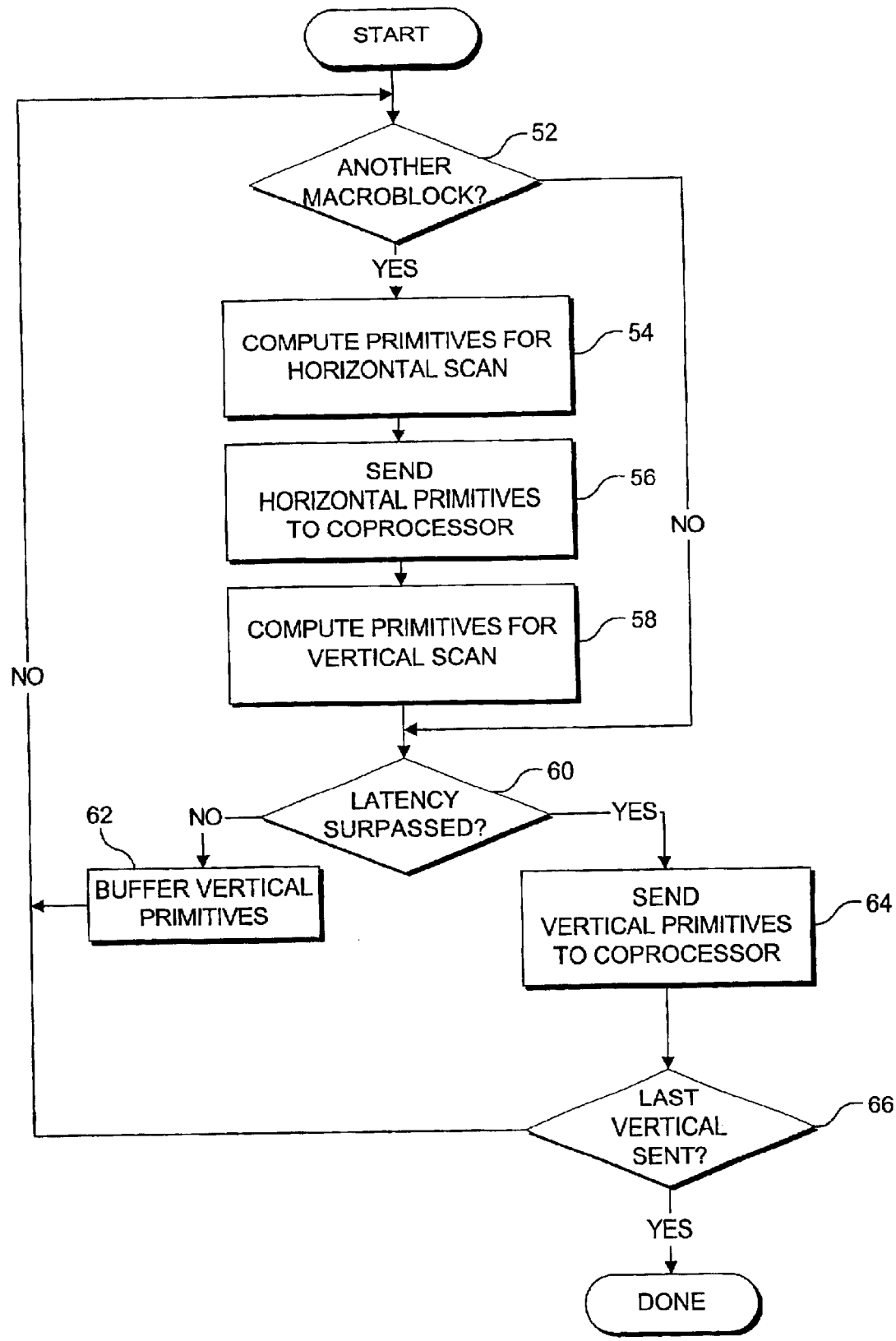
FIG. 4 is a flow diagram illustrating an overview of logical steps employed for padding a boundary macroblock in an embodiment of the present invention.

FIG. 4 illustrates an overview of the general logic applied for padding a boundary macroblock. At a decision step 52, the host processor determines whether another macroblock must be padded. If so, at a step 54, the host processor performs a horizontal scan from left to right across each row of the macroblock and computes primitives for padding transparent pixels in each row. Once all of the primitives are computed for each row of the macroblock, the host computer sends these horizontal primitives to the graphics coprocessor, at a step 56, to enable the graphics coprocessor to immediately start padding the macroblock.

The shape data in some rows are all zeros, having no opaque pixels, and thus, these rows cannot be padded with a horizontal primitive. Therefore, the host processor performs a vertical scan from top to bottom down each column of the macroblock, at a step 58, and computes vertical primitives for each column. Steps 54 through 58 are skipped if the host processor determined in decision step 52 that no more macroblocks need to be processed. Instead, the host processor just sends the last of the vertical primitives after a latency period has passed, as explained below.

Vertical primitives cannot be processed by the graphics coprocessor until all of the horizontal primitives have been processed. Rather than expend the time and overhead communicating with the graphics coprocessor to determine whether the graphics coprocessor has completed the horizontal primitives, the host processor preferably waits for a predefined latency period. The latency period is the expected period of time required by a graphics coprocessor to process all of the horizontal primitives for one macroblock. This latency period will vary, depending on the capabilities of the graphics coprocessor being used. Thus, at a decision step 60, the host processor determines whether the latency period has been surpassed. If the latency period has not yet been surpassed, the host processor simply buffers the vertical primitives, at a step 62, and returns ready to process another macroblock at decision step 52. If the latency period has been surpassed, the host processor sends the vertical primitives to the graphics coprocessor, at a step 64. This technique enables the graphics coprocessor to process sets of horizontal and vertical primitives in a pipelined fashion.

The host processor then determines, at a decision step 66, whether the last vertical primitive for all of the macroblocks has been sent to the graphics coprocessor. If not, the host processor returns to decision step 52, to start processing the next macroblock. Once the last vertical primitive has been sent, the host processor is done, and the graphics coprocessor macroblock padding process terminates. Those skilled in the art will recognize that exterior blocks may be padded with similar horizontal and vertical primitives, based on texture values at the edges of adjacent boundary blocks.

Figure 5:
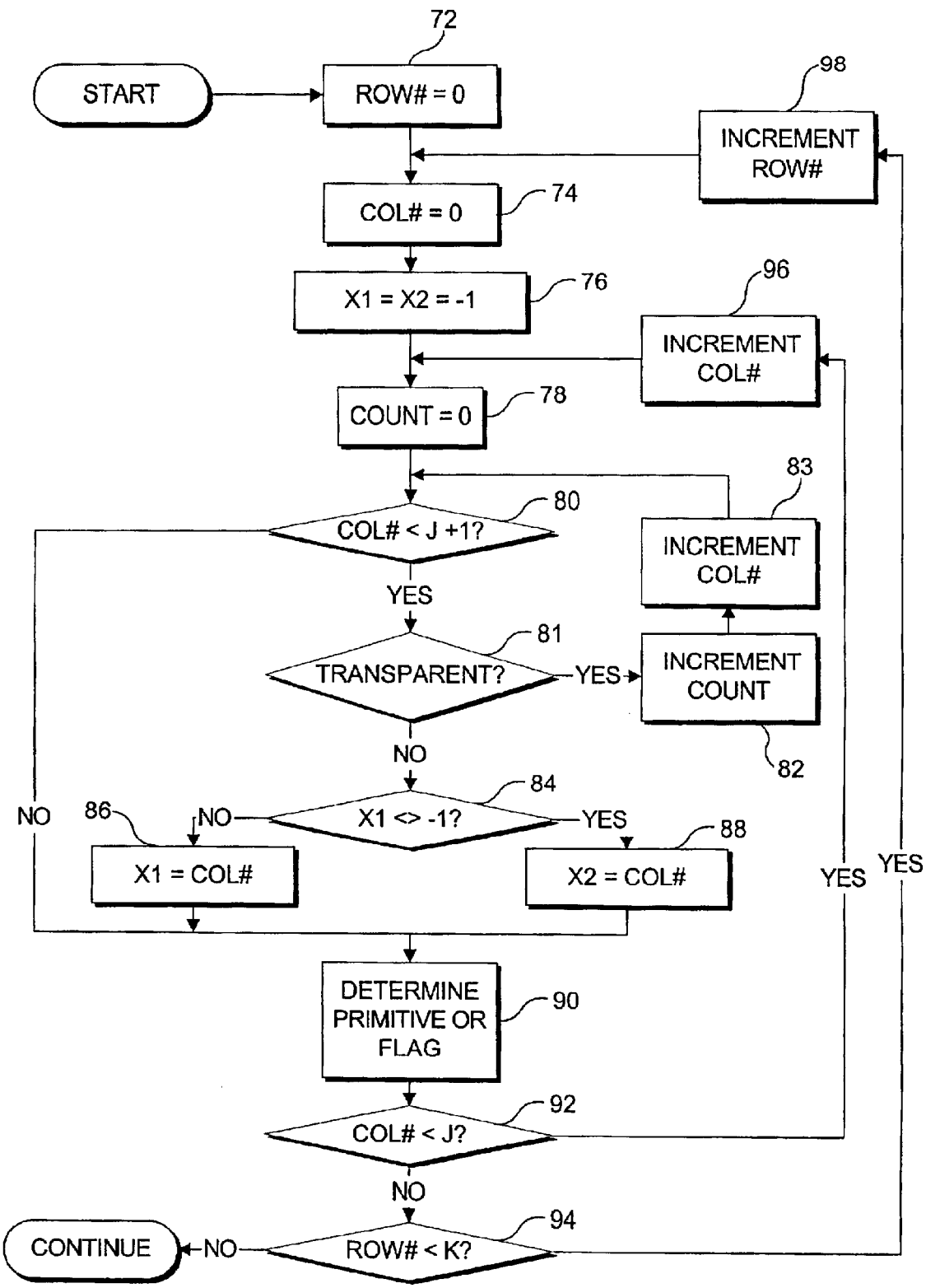
FIG. 5 is a flow diagram illustrating the logical steps for horizontal scanning and processing a macroblock.

FIG. 5 is a flow diagram illustrating the logic for horizontal scanning and processing of a macroblock. FIG. 5 provides detail of step 54 in FIG. 4. At a step 72 of FIG. 5, the host processor initializes a row number to zero. At a step 74, the host processor initializes a column number to zero. At a step 76, the host processor sets a first horizontal value variable X1 and a second horizontal value variable X2 equal to −1. X1 will generally correspond to a left opaque pixel texture value in a horizontal row, and X2 will generally correspond to a right opaque pixel texture value in a horizontal row. At a step 78, the host processor initializes a count equal to zero.

At a decision step 80, the host processor determines whether the column number is less than a total number of columns (e.g., J=16) plus one. Using one more than the total number of columns enables the host processor to detect a single transparent pixel at the end of a row. If the column number is equal to, or greater than, the total number of columns plus one (e.g., col# =17), the current row has been completed. However, if the column number is less than the total number of columns plus one (e.g., col# <17), additional pixels in the current row must still be processed.

The host processor begins processing the current pixel at the coordinate of the current row# and the current column# by determining, at a decision step 81, whether the current pixel is transparent (i.e., has a shape data value that is equal to 0) and must be padded. If the current pixel is transparent, the host processor increments the count by one, at a step 82. The host processor then increments the column number by one, at a step 83. This loop of steps 81 through 83 counts a number of consecutive transparent pixels within a row of pixels in the macroblock. The host processor again determines, at decision step 80, whether the end of the row has been exceeded. If the end of the row has not been exceeded, the host processor determines whether the next pixel in the current row is transparent, at step 81.

Once the host processor finds an opaque pixel in the current row (e.g., having a shape data value equal to 1), the host processor determines, at a decision step 84, whether X1 has previously been set to a texture value other than −1. If X1 has not previously been set to a texture value other than −1 the host processor sets X1 equal to the current column number, at a step 86. This step identifies the current column number in the current row as the coordinate of the texture pixel in the texture data to be used by the graphics coprocessor for obtaining a first texture value for padding the counted transparent pixels. X2 remains set to its initial value of −1. The first texture value will be used as the only texture value for padding in two circumstances. In one circumstance, the first texture value will be used alone to pad one or more transparent pixels that occur at the beginning of a row up to the first opaque pixel. For example, in FIG. 3, the texture value associated with pixel 46 will be used alone to pad pixel 45 with a dot primitive. Conversely, in the second circumstance, the first texture value will be used alone to pad one or more transparent pixels at the end of a row that follow an opaque pixel, but no other opaque pixels occur to the end of the row. For example, in FIG. 3, the texture value associated with pixel 43 will be used to pad all the transparent pixels that follow pixel 43 in the row of pixel 43, using a line primitive.

However, if the host processor determines, at decision step 84 of FIG. 5, that X1 was previously set to a column number associated with a first texture value (i.e., that X1 is not equal to −1), the host processor sets X2 equal to the current column number, at a step 88. This step identifies the current column number in the current row as the coordinate of the texture pixel in the texture data to be used by the graphics coprocessor for obtaining a second texture value for padding the counted transparent pixels. The graphics coprocessor will use this second texture value in conjunction with the first texture value to produce an average texture value. The graphics coprocessor will then use the average texture value to pad transparent pixels that fall between the first opaque pixel and the second opaque pixel. For example, in FIG. 3 the average of the texture values associated with pixels 46 and 49 will be used to pad transparent pixels 47 through 48, using a horizontal line primitive.

Once X1 and X2 are defined, the host processor determines the appropriate horizontal primitive to send to the graphics coprocessor, at a step 90, based on the count of transparent pixels. During step 90, the host processor may alternatively determine that the entire row contains transparent pixels. Instead of sending a horizontal primitive, the host processor may send a flag to the graphics coprocessor that the row of transparent pixels must be processed during the vertical pass of the macroblock.

At a decision step 92, the host processor next determines whether the current column number is less than the total number of columns in the macroblock (e.g., less than J). This step determines whether any more pixels remain to be processed in the current row. If the current column number is less than the total number of columns in the macroblock, then at least one more pixel remains to be processed in the current row. Thus, the host processor increments the current column number by one, at a step 96, and resets the count to zero at step 78, to prepare for counting another set of transparent pixels in the same row. If the current column number is equal to, or greater than, the total number of columns in the macroblock, all of the pixels in the current row have been processed.

In that case, the host processor determines, at a decision step 94, whether the current row number is less than the total number of rows in the macroblock (e.g., less than K). This step determines whether any more rows of pixels remain to be processed in the macroblock. If the current row number is less than the total number of rows in the macroblock, then at least one more row of pixels remains to be processed in the macroblock. Thus, the host processor increments the current row number by one, at a step 98, and resets the column number to zero at step 74 to prepare for processing another row of pixels. If the current row number is equal to, or greater than, the total number of rows in the macroblock, all of the pixels in the current macroblock have been processed through the horizontal pass.

Figure 6:
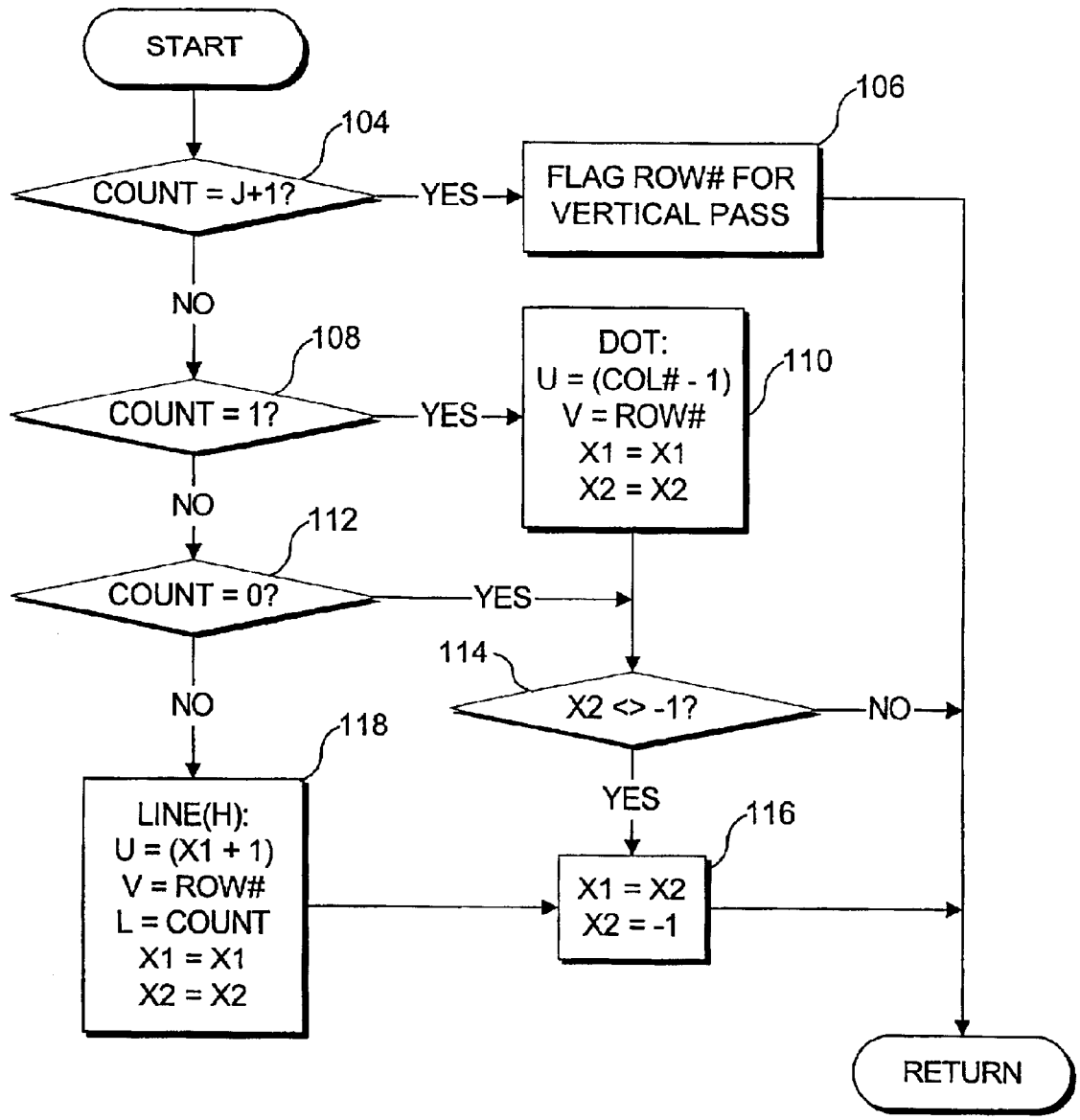
FIG. 6 is a flow diagram illustrating the logical steps for determining a horizontal primitive or flag to send to the graphics coprocessor.

FIG. 6 is a flow diagram illustrating the logical steps for determining a horizontal primitive or flag to send to the graphics coprocessor. FIG. 6 provides detail for step 90 in FIG. 5. At a decision step 104 of FIG. 6, the host processor determines whether the count of transparent pixels is equal to the total number of columns in the macroblock plus one (e.g., J+1). If the count of transparent pixels is equal to the total number of columns in the macroblock plus one, the entire row of pixels contains only transparent pixels. In that case, the host processor cannot identify any column number that the graphics coprocessor can use to obtain a texture value for use in padding any of the pixels in the current row. Instead, the host processor must look for a nearby opaque pixel above or below each pixel in the entire current row of transparent pixels. Thus, the host processor simply flags the current row number, at a step 106, as a row that must be processed during the vertical pass. The flag for the current row number is preferably simply stored in a stack or a one-dimensional array.

If the current row is not entirely comprised of transparent pixels, the host processor determines, at a decision step 108, whether the current count of transparent pixels is equal to one. If so, the host processor defines a dot primitive, at a step 110, to be sent to the graphics coprocessor. The dot primitive has four arguments. The first argument is a U coordinate, corresponding to the column number of the pixel to be padded. However, the current column number is incremented at step 83 of FIG. 5, after counting a transparent pixel. Thus, the column number of the pixel to be padded is actually set to one less than the current column number. The second argument is a V coordinate, corresponding to the row number of the pixel to be padded. In this case, the current row number is not incremented beyond the row number corresponding to the pixel to be padded. Thus, V is simply set to the current row number.

The third argument is the column number of the opaque pixel, corresponding to the first texture value that will be used to pad the transparent pixel. The column number of the first opaque pixel identified is stored as X1. Note that the dot primitive need only use the texture value associated with the first opaque pixel identified next to the transparent pixel to be padded, if the single transparent pixel is in the first column or the last column. Thus, X1 may represent the opaque pixel to the left of the transparent pixel to be padded, if the opaque pixel occurred before the transparent pixel (e.g., if the shape data equal 10 for the two pixels). In contrast, X1 may represent the opaque pixel to the right of the transparent pixel to be padded, if the opaque pixel occurred after the transparent pixel (e.g., if the shape data equal 01 for the two pixels), and the transparent pixel to be padded is the very first pixel in a row.

Specifically, when a transparent pixel is the very first pixel in a row and is followed immediately by an opaque pixel, the transparent pixel is padded with the texture value associated with the subsequent opaque pixel. There is no other opaque pixel on the opposite side of the transparent pixel, so an average texture value cannot be computed. Similarly, when a transparent pixel is the very last pixel in a row, and is preceded immediately by an opaque pixel, the transparent pixel is padded with the texture value associated with the preceding opaque pixel. Again, there is no other opaque pixel on the opposite side of the transparent pixel, so an average texture value cannot be computed. In both cases, for purposes of the dot primitive, X1 corresponds to the texture value to be used for padding. The fact that the single texture value is to be used is communicated to the graphics coprocessor by sending the fourth argument, X2, with a value of negative one (−1).

However, in many cases, a single transparent pixel falls between two opaque pixels. In that case, the fourth argument, X2, provides the column number of the second opaque pixel. The coprocessor can pad the single transparent pixel with an average of the texture value associated with the first opaque pixel and the texture value associated with the second opaque pixel. Note that a separate row coordinate is not needed for the transparent pixel, first opaque pixel, and second opaque pixel, because they all fall within the same horizontal row that is identified by the V argument.

If the count of transparent pixels is not equal to one, the host processor determines, at a decision step 112, whether the count is equal to zero. This step occurs when an opaque pixel is detected before counting any transparent pixels, such as in the row of pixel 42 in FIG. 3. A true result of decision step 112 effectively leads to a null operation that is needed to make the logic flow consistent before incrementing the column number. Although no padding operation will be sent to the graphics coprocessor if the count is equal to zero, the host processor must determine whether the value of the first opaque pixel variable, X1, must be replaced with the value of the second opaque pixel variable, X2.

For example, in the row of pixel 42 in FIG. 3, there are three opaque pixels. Thus, for the first three increments in the column number, the count of transparent pixels will remain zero. Since no transparent pixels occur between the three opaque pixels, for purposes of identifying a texture value that will be used to pad, the column number corresponding to the "first" opaque pixel, X1, must be shifted to the right until a transparent pixel is found. Specifically, while evaluating the first pixel in the row, pixel 42, the host processor will set X1 to column number 1. X2 will retain its initial value of negative one (−1). After incrementing to the second pixel in the row, the host processor will set X2 to column number 2. However, because the count of transparent pixels remains zero, the column number corresponding to the "first" opaque pixel, X1, for purposes of identifying a texture value to pad a subsequent transparent pixel, must be shifted right to column number 2. Similarly, when incremented to the third pixel in the row, the count of transparent pixels still remains zero, but the host processor will now set the value of X2 to column number 3. To keep X1 up to date, because the count of transparent pixels remains zero, the column number corresponding to the "first" opaque pixel, X1, must again be shifted right to column number 3.

To accommodate this shifting, the host processor determines, at a decision step 114, whether X2 already has a value other than negative one (−1). If X2 still has a value of negative one (−1), the value of X1 does not need to be updated. However, if X2 already has a value other than negative one (−1), the value of X1 is updated at a step 116. The update is accomplished simply by assigning the current value of X2 to X1. The value of X2 is then reset to negative one (−1).

For any other count of transparent pixels between two and the total number of columns (e.g., J), at a step 118 of FIG. 6, the host processor defines a horizontal line primitive to be sent to the graphics coprocessor. The horizontal line primitive has five arguments. The first argument is a U coordinate, corresponding to the column number of the first pixel in the line to be padded. This first column number follows the column number of the first opaque pixel, which is stored in X1. Thus, the value of U is set to one more than the column number stored in X1 (i.e., to X1+1).

As was true of the second argument for the dot primitive, the second argument of the horizontal line primitive is a V coordinate, corresponding to the row number of the pixels to be padded with a line. Again, the current row number is not incremented beyond the row number corresponding to the pixels to be padded. Thus, V is simply set to the current row number.

The third argument of the horizontal line primitive is a length of the line primitive. The length of the line is simply the count of consecutive transparent pixels that must be padded. The fourth argument of the horizontal line primitive is the column number of the opaque pixel, corresponding to the first texture value that will be used to pad the line of transparent pixels. This pixel, of course, is identified by the column number stored in X1. Similarly, the fifth argument of the horizontal line primitive is the column number of the opaque pixel, corresponding to the second texture value that will be used to pad the line segment of transparent pixels. This pixel is identified by the column number stored in X2. For the horizontal line primitive, the graphics coprocessor uses an average of the first texture value and the second texture value to pad the line of pixels.

Once the arguments of a horizontal line primitive are set, the host processor resets the value of X1 to the column number stored in X2, at step 116. This step ensures that X1 is shifted to the right and ready for any further transparent pixels that may follow. Correspondingly, the value of X2 is reset to negative one (−1).

Figure 7:
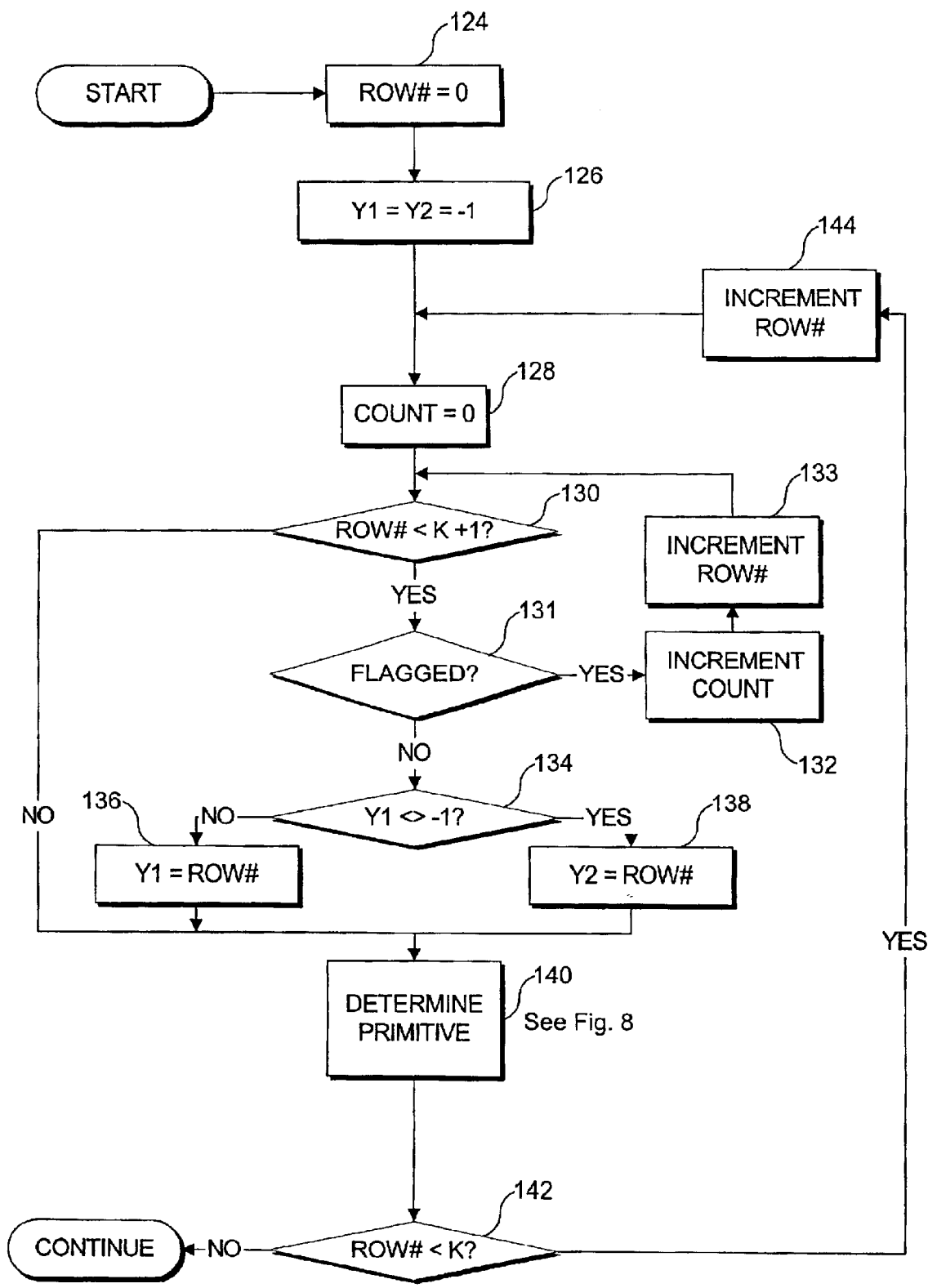
FIG. 7 is a flow diagram illustrating the logical steps for vertical scanning and processing a macroblock.

FIG. 7 is a flow diagram illustrating the logical steps for vertical scanning and processing of a macroblock. This Figure provides detail for step 58 in FIG. 4, similar to the detail for horizontal scanning, shown in FIG. 5. At a step 124 of FIG. 7, the host processor initializes a row number to zero. At a step 126, the host processor sets a first vertical variable Y1 and a second vertical variable Y2 equal to −1. Y1 will generally correspond to a top opaque pixel texture value in a vertical column, and Y2 will generally correspond to a bottom opaque pixel texture value in a vertical column. At a step 128, the host processor initializes a count equal to zero.

At decision step 130, the host processor determines whether the row number is less than a total number of rows (e.g., K=16) plus one. Using one more than the total number of rows enables the host processor to detect a single transparent pixel at the bottom of a column. If the row number is equal to, or greater than, the total number of rows plus one (e.g., row# =17), the current column has been completed. However, if the row number is less than the total number of row plus one (e.g., row# <17), additional pixels in the current column must still be processed.

The host processor begins processing the current row of pixels by first determining, at a decision step 131, whether the current row was flagged during the horizontal scan, as containing all transparent pixels (e.g., shape data all equaling zeros). If the current row was flagged, the host processor increments the count by one, at a step 132. The host processor then increments the row number by one, at a step 133. This loop of steps 131 through 133 counts a number of consecutive rows containing all transparent pixels in the macroblock. The host processor again determines, at decision step 130, whether all of the rows have been processed. If all of the rows have not been processed, the host processor determines whether the next row was flagged, at step 131.

Once the host processor finds a row that has at least one opaque pixel, the host processor determines, at a decision step 134, whether Y1 has previously been set to a texture value other than −1. If Y1 has not previously been set to a texture value other than −1, the host processor sets Y1 equal to the current row number, at a step 136. This identifies the current row number as the row coordinate of the texture pixels in the texture data to be used by the graphics coprocessor for obtaining a first set of texture value for padding the row of transparent pixels. Y2 remains set to its initial value of −1. Similar to horizontal scanning, the first set of texture values will be used as the only texture values for padding in two circumstances. In one circumstance, the first set of textures value will be used alone to pad one or more rows of transparent pixels that occur at the top of a macroblock down to the first row flagged to includes at least one opaque pixel. Conversely, in the second circumstance, the first set of texture values will be used alone to pad one or more rows at the bottom of a macroblock that follow a row flagged to include at least one opaque pixel, but no other rows flagged to include opaque pixels occur to the end of the macroblock. For example, in FIG. 3, the set of texture values associated with the pixels of the second-to-last row will be used to pad all the transparent pixels in the last row of the macroblock with a line-v primitive. A line-v primitive provides a line through each column of a row in which only transparent pixels are found. Each pixel of a transparent row may be padded with a unique texture value, depending on the value of each pixel above and below the row of transparent pixels. Thus, the line-v primitive may pad the row on a pixel-by-pixel basis. However, a dot primitive is not available for vertical processing, because vertical processing will never result in padding a single pixel by itself, since a whole row of transparent pixels is a prerequisite to vertical processing. Thus, a line-v primitive is used, even for a single row that is only one pixel high.

However, if the host processor determines, at decision step 134 of FIG. 7, that Y1 was previously set to a row number associated with a first vertical texture value (i.e., Y1 is not equal to −1), the host processor sets Y2 equal to the current row number, at a step 138. This step identifies the current row number as the row coordinate of the texture pixels in the texture data to be used by the graphics coprocessor for obtaining a second set of texture values for padding the row of transparent pixels. The graphics coprocessor will use this second set of texture values in conjunction with the first set of texture values to produce an average texture value in each column of the row to be vertically padded. The graphics coprocessor will use each average texture value to pad transparent pixel that falls between the rows identified by Y1 and Y2. For example, in FIG. 3 the average of the texture values associated with the twelfth ($12^{th}$) row and the fourteenth ($14^{th}$) row will be used to pad the transparent pixels of the thirteenth ($13^{th}$) row with a line-v primitive.

Once Y1 and Y2 are defined, the host processor determines the appropriate vertical primitive to send to the graphics coprocessor, at a step 140, based on the count of flagged rows. During step 140, the host processor may alternatively determine that all rows of the entire macroblock contains transparent pixels. Instead of sending a vertical primitive, the host processor may send an indication to the graphics coprocessor to use extended padding for the entire macroblock.

At a decision step 142, the host processor then determines whether the current row number is less than the total number of rows in the macroblock (e.g., less than K). This step determines whether any more rows remain to be processed in the current macroblock. If the current row number is less than the total number of rows in the macroblock, then at least one more row remains to be processed in the current macroblock. If so, the host processor increments the current row number by one, at a step 144, and resets the count to zero at step 128, to prepare for counting another set of flagged transparent rows in the same macroblock. If the current row number is equal to, or greater than, the total number of rows in the macroblock, all of the rows in the current row have been processed through the vertical pass.

Figure 8:
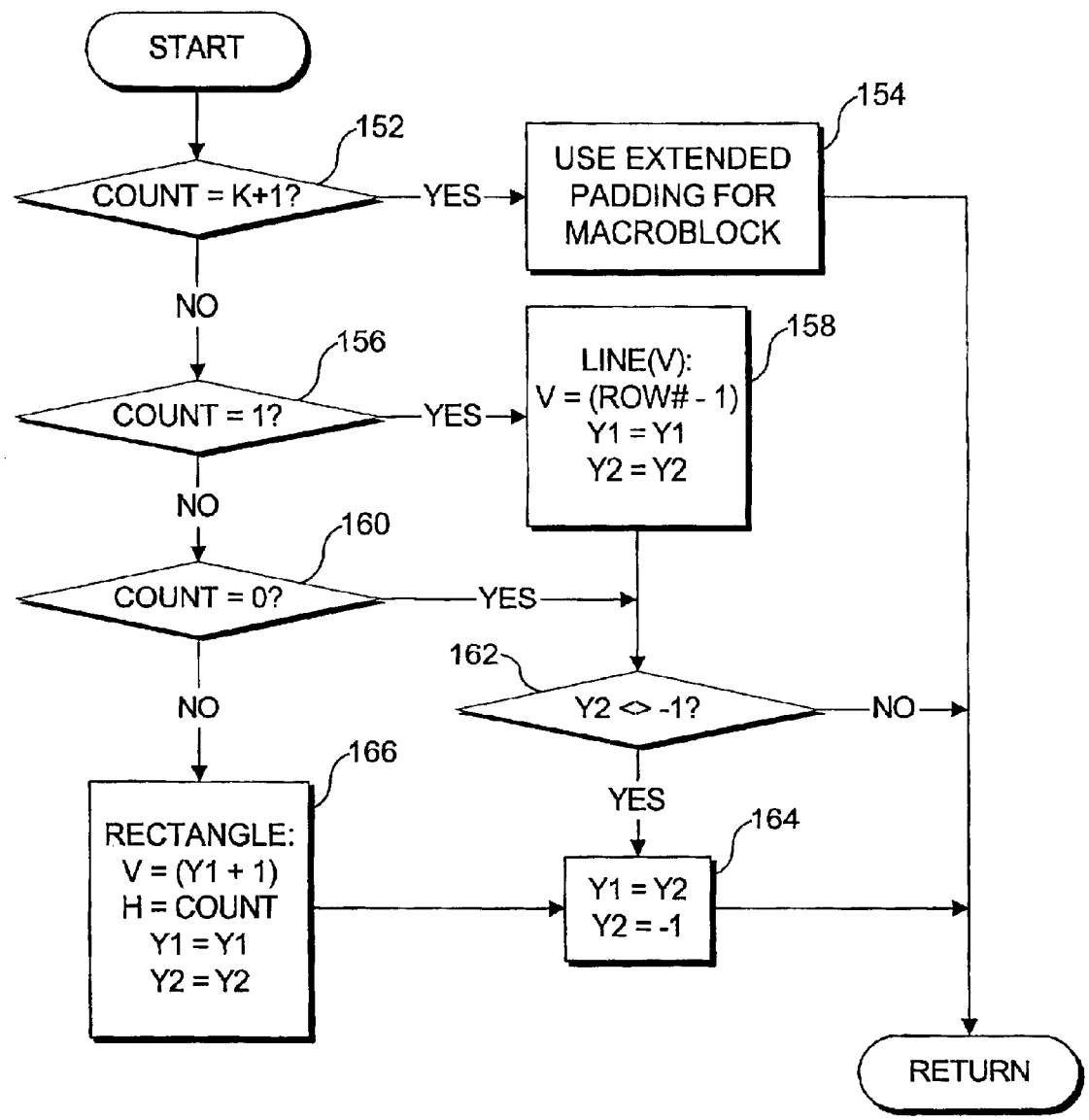
FIG. 8 is a flow diagram illustrating the logical steps for determining a vertical primitive or indication of extended padding to send to the graphics coprocessor.

FIG. 8 is a flow diagram illustrating logical steps for determining a vertical primitive or indication of extended padding to send to the graphics coprocessor. FIG. 8 provides details for step 140 in FIG. 7. At a decision step 152 of FIG. 8, the host processor determines whether the count of flagged rows is equal to the total number of rows in the macroblock plus one (e.g., K+1). If the count of flagged rows is equal to the total number of rows in the macroblock plus one, the entire macroblock contains only transparent pixels. In that case, the host processor cannot provide any primitives to the graphics coprocessor to obtain any texture values to use for padding any of the pixels in the macroblock. Instead, the host processor can only instruct the graphics coprocessor to use extended padding for the macroblock, at a step 154.

If the macroblock is not entirely comprised of transparent pixels, the host processor determines, at a decision step 156, whether the current count of flagged transparent rows is equal to one. If the current count of flagged transparent rows is equal to one, the host processor defines a line-v primitive to be sent to the graphics coprocessor, at a step 158. The line-v primitive has three arguments. The first argument is a V coordinate, corresponding to the row number of the row of transparent pixels to be padded. However, the current row number is incremented at step 133 of FIG. 7, after counting a flagged row. Thus, the row number of the row to be padded is actually set to one less than the current row number.

The second argument of the line-v primitive is the row number of the nearest row with at least one opaque pixel, corresponding to the first set of texture values that will be used to pad the flagged row of transparent pixels. The row number of the nearest row identified is stored as Y1. Note that the line-v primitive need only use the set of texture values associated with the nearest row of at least one opaque pixel that is identified above the row of transparent pixels to be padded, if the single row of transparent pixels is in the first row or the last row. Thus, Y1 may represent the nearest row of at least one opaque pixel above the row of transparent pixels to be padded, if the nearest row with at least one opaque pixel is disposed before the row of transparent pixels (e.g., 10 vertically). Or, Y1 may represent the nearest row with at least one opaque pixel below the row of transparent pixels to be padded, if the nearest row with at least one opaque pixel is disposed below the row of transparent pixel (e.g., pixels with shape data equal to 01 vertically) and the row of transparent pixels to be padded is the very first row in a macroblock.

When a flagged row of transparent pixels is the very first row of the macroblock and is followed immediately by a row with at least one opaque pixel, the flagged row of transparent pixels is padded with the texture values associated with the subsequent row of at least one opaque pixel. There is no other row with at least one opaque pixel above the flagged row of transparent pixels, so a set of average texture values cannot be computed. Similarly, when a flagged row of transparent pixel is the very last row in a macroblock, and the flagged row is preceded immediately by a row with at least one opaque pixel, the row of transparent pixels is padded with the texture values associated with the preceding row having at least one opaque pixel. Again, there is no other row with at least one opaque pixel on the opposite side of the flagged row of transparent pixels, so a set of average texture values need not be computed. In both cases, for purposes of the line-v primitive, Y1 identifies the row of texture values to be used for padding. The fact that the single set of texture values is to be used, is communicated to the graphics coprocessor by sending the third argument, Y2, with a value of negative one (−1).

However, in many cases, a single row of flagged transparent pixels falls between two rows, each with at least one opaque pixel. In that case, the third argument, Y2, provides the row number of the second row with at least one opaque pixel. The coprocessor can pad the single row of transparent pixels with the set of average texture values associated with the nearest row with at least one opaque pixel and the set of texture values associated with the opposite row with at least one opaque pixel. A separate column coordinate is not needed for the flagged row of transparent pixels, for the first row with at least one opaque pixel, and for the second row with at least one opaque pixel, because these rows include all the columns of the macroblock (i.e., K).

If the count of flagged rows is not equal to one, the host processor determines, at a decision step 160, whether the vertical count is equal to zero. This condition occurs when a row with at least one opaque pixel is detected before counting any flagged rows of transparent pixels, such as the first six rows in FIG. 3. As in the horizontal scan, a positive determination at decision step 160 effectively leads to a null operation that is needed to make the logic flow consistent before incrementing the row number. Although no padding operation primitive will be sent to the graphics coprocessor, if the vertical count is equal to zero, the host processor must determine whether the value of variable Y1, must be shifted down a row by being replaced with the value of variable Y2.

For example, in the expanded macroblock in FIG. 3, the first six rows include at least one opaque pixel. Thus, for the first six increments in the row number, the count of flagged rows will remain zero. Since no flagged rows occur between any of the first six rows, the row number corresponding to the "first" row with at least one opaque pixel, Y1, for purposes of identifying a set of texture values to pad with, must be shifted down until a flagged row of transparent pixels is found. Specifically, while evaluating the first row of the macroblock, the host processor will set Y1 to row number 1. Y2 will retain its initial value of negative one (−1). After incrementing to the second row in the macroblock, the host processor will set Y2 to row number 2. Because the count of flagged rows remains zero, the row number corresponding to the "first" row with at least one opaque pixel, Y1, for purposes of identifying a set of texture values to pad a subsequent flagged row of transparent pixels, must be shifted down to row number 2. Similarly, when incremented to the third row, the count of flagged rows still remains zero, but the host processor will now set the value of Y2 to row number 3. To keep Y1 up to date, because the count of flagged rows remains zero, the row number corresponding to the "first" row with at least one opaque pixel, Y1, must again be shifted down to row number 3. This shifting continues until Y1 is set to row six, after which a flagged row of transparent pixels is detected.

To accommodate this shifting, the host processor determines, at a decision step 162, whether Y2 already has a value other than negative one (−1). If Y2 still has a value of negative one (−1), the value of Y1 does not need to be updated, such as for the first row. However, if Y2 already has a value other than negative one (−1), the value of Y1 is updated at a step 164. The update is accomplished simply by assigning the current value of Y2 to Y1. The value of Y2 is then reset to negative one (−1).

For any other count of flagged rows between two and the total number of rows (i.e., K), the host processor defines a rectangle primitive, at a step 166 of FIG. 8, to be sent to the graphics coprocessor. The rectangle primitive has four arguments. The first argument is a V coordinate, corresponding to the row number of the first flagged row in a rectangular box of rows to be padded. This first row number follows the row number of the "first" row with at least one opaque pixel, which is stored in Y1. Thus, the value of V is set to one more than the row number stored in Y1 (i.e., to Y1+1).

The second argument of the rectangle primitive is the height of the rectangle. The height of the rectangle is simply the count of consecutive flagged rows. The third argument of the rectangle primitive is the row number of the "first" row with at least one opaque pixel, corresponding to the first set of texture values that will be used to pad the rectangle of transparent pixels. This, of course, corresponds to the row number stored in Y1. Similarly, the fourth argument of the rectangle primitive is the row number of the "second" row with at least one opaque pixel, corresponding to the second set of texture values that will be used to pad the rectangle of transparent pixels. This value corresponds to the column number stored in Y2. To pad the rectangle of pixels with the rectangle primitive, the graphics coprocessor uses a column-by-column average of each pixel associated with the first set of texture values and each corresponding pixel in the same column associated with the second set of texture values. In general, the texture value associated with a column pixel of row Y1 is averaged with the texture value associated with the pixel in the same column or row Y2. Effectively, this creates a series of vertical padded lines, each pixel in a vertical padded line having an average of the texture value of the pixel at the top end of the line and of the pixel at the bottom end of the line.

Once the arguments of a rectangle primitive are set, the host processor resets the value of Y1 to the row number stored in Y2, at step 164. This step ensures that Y1 is shifted down and ready for any further flagged rows of transparent pixels that may follow. Correspondingly, the value of Y2 is reset to negative one (−1).

Figure 9:
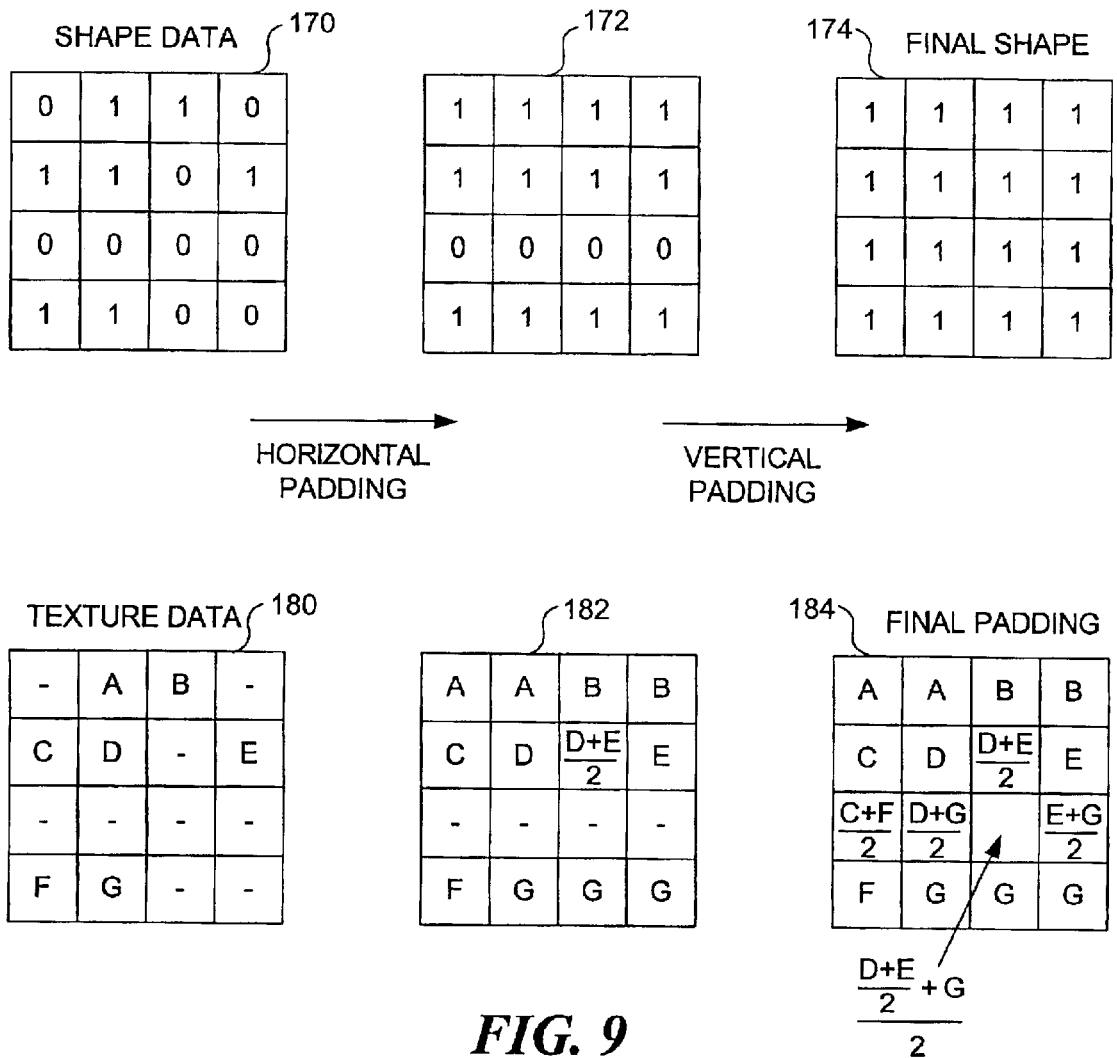
FIG. 9 illustrates an exemplary boundary block padding according to the process of the above preferred embodiment.

FIG. 9 shows an example of boundary block padding according to the process of the above preferred embodiment. A simple 4×4 block is shown for simplicity. As described above, each pixel with a shape value of zero (0) represents a transparent pixel, and each pixel with a shape value of one (1) represents an opaque pixel. An original boundary block 170 illustrates original shape data. An original texture block 180 illustrates texture data corresponding to the original shape data of original boundary block 170. Note that pixels of original texture block 180 that have a dash are not necessarily empty. Instead, a dash simply means that the texture value of those pixels is irrelevant to the corresponding shape data.

An intermediate shape block 172 illustrates logical intermediate shape data that results from the horizontal padding process. Note that the intermediate shape data generated by horizontal padding always comprise rows with either all zeros or all ones. Similar to the intermediate shape data, an intermediate texture block 182 illustrates intermediate texture data that results from the horizontal padding process. A dot primitive is used to effectively copy texture value A and texture value B in the first row to their adjacent transparent pixels. A horizontal line primitive is used to compute an average texture value for the transparent pixel between opaque pixels corresponding to texture value D and texture value E in the second row. The third row of original shape block 170 contains only transparent pixels. Thus, the third row of corresponding intermediate texture block 182 is still empty after horizontal padding. This third row is flagged for vertical processing.

A final shape block 174 illustrates logical final shape data that results after the vertical padding process. After vertical padding, each pixel in the block has an original texture value or a padded texture value, so all pixels in final shape block 174 have a shape data value equal to one. Similar to the final shape block, a final texture block 184 illustrates final texture data that results after the vertical padding process is complete. During vertical padding, each pixel of the flagged row is filled with an average texture values from each corresponding pixel in the second and fourth rows. Note that the third pixel of the third row has an average texture value of two pixels that were previously padded during the horizontal padding process.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

What is claimed is:

1. A method for padding a macroblock of a video object, comprising the steps of:
   (a) horizontally scanning shape data for successive rows of the macroblock with a host processor to detect any transparent pixels and any opaque pixels contained in each row;
   (b) at each occurrence of one or more transparent pixels in a row having at least one opaque pixel, detected while horizontally scanning the shape data, determining a horizontal primitive with the host processor, as a function of a number of successive transparent pixels detected in the row;
   (c) communicating the horizontal primitive to a coprocessor for horizontal padding of the row of the macroblock of step (b), as a function of texture data associated with one or more opaque pixels that are adjacent to said one or more transparent pixels, producing horizontally padded pixels;
   (d) for each row that includes only transparent pixels, determining a vertical primitive as a function of a number of adjacent rows that include only transparent pixels; and
   (e) communicating the vertical primitive to the coprocessor or vertical padding of the macroblock as a function of the texture data associated with pixels disposed in one or more adjacent rows, producing a fully padded macroblock.

2. The method of claim 1, wherein the step of determining the horizontal primitive, comprises the step of determining a coordinate of a first opaque pixel that is adjacent to the one or more transparent pixels in the horizontal row of the macroblock, if the horizontal row includes at least one opaque pixel.

3. The method of claim 2, further comprising the step of determining a coordinate of a second opaque pixel that is adjacent to the one or more transparent pixels in the horizontal row of the macroblock if the sequential transparent pixels are bounded by opaque pixels on two sides in the horizontal row.

4. The method of claim 2, further comprising the step of updating the coordinate of the first opaque pixel if more than one opaque pixel occurs sequentially within the horizontal row.

5. The method of claim 1, wherein the step of determining the horizontal primitive comprises the steps of:
   (a) flagging a row number of any horizontal row of the macroblock having only transparent pixels;
   (b) assigning a dot primitive as the horizontal primitive for padding any transparent pixel that is not adjacent to any other transparent pixel; and
   (c) assigning a horizontal line as the horizontal primitive if the number of successive transparent pixels is greater than one.

6. The method of claim 5, wherein the step of determining a vertical primitive comprises the steps of:
  (a) determining that extended padding must be used for the macroblock if all rows of the macroblock are flagged as having only transparent pixels; and if not,
  (b) assigning a line-v primitive as the vertical primitive for use in padding a flagged row if the flagged row is not adjacent to another flagged row; and
  (c) assigning a rectangle primitive as the vertical primitive if the number of successive flagged rows is greater than one.

7. The method of claim 1, wherein the step of determining the vertical primitive, comprises the steps of:
  (a) determining a number of successive flagged rows in the macroblock, wherein a flagged row is identified during the step of horizontally scanning and is a horizontal row having only transparent pixels; and
  (b) if the macroblock includes at least one flagged row, determining a row coordinate of a first row that comprises at least one opaque pixel and that is adjacent to said at least one flagged row.

8. The method of claim 7, further comprising the step of determining a coordinate of a second row that is adjacent to the successive flagged rows in the macroblock if the successive flagged rows are between rows each having at least one opaque pixel.

9. The method of claim 7, wherein the step of determining the row coordinate of the first row comprises the steps of identifying any successive rows that comprise at least one opaque pixel until the row having at least one opaque pixel and which is adjacent to said at least one flagged row is identified.

10. The method of claim 1, wherein the step of communicating the vertical primitive to the coprocessor, comprises the steps of:
  (a) determining whether a latency period has been surpassed, said latency period being selected to be sufficiently long to enable the coprocessor to complete horizontal padding of a predefined number of macroblocks; and
  (b) if the latency period has been surpassed, communicating the vertical primitive to the coprocessor along with at least one argument associated with the vertical primitive.

11. The method of claim 1, further comprising the steps of:
  (a) causing the coprocessor to horizontally pad any transparent pixels with texture data associated with a coordinate of one or more opaque pixels identified in the horizontal primitive communicated to the coprocessor; and
  (b) causing the coprocessor to vertically pad transparent pixels with texture data associated with a coordinate of one or more opaque pixels identified in the vertical primitive communicated to the coprocessor.

12. The method of claim 11, wherein the step of causing the coprocessor to horizontally pad comprises the steps of:
  (a) causing the coprocessor to pad any transparent pixels identified in the horizontal primitive with texture data associated with a coordinate of one opaque pixel identified in the horizontal primitive if only one opaque pixel is identified in the horizontal primitive; and
  (b) causing the coprocessor to pad any transparent pixels identified in the horizontal primitive with an average of texture data associated with coordinates of two opaque pixels identified in the horizontal primitive if two opaque pixels are identified in the horizontal primitive.

13. The method of claim 11, wherein the step of causing the coprocessor to vertically pad comprises the steps of:
  (a) causing the coprocessor to pad transparent pixels identified in the vertical primitive with texture data associated with a coordinate of one adjacent row identified in the vertical primitive if only one adjacent row is identified in the vertical primitive; and
  (b) causing the coprocessor to pad any transparent pixels identified in the vertical primitive with an average of texture data associated with coordinates of two adjacent rows identified in the vertical primitive if two adjacent rows are identified in the vertical primitive.

14. The method of claim 1, wherein the horizontal and vertical primitives are determined by the host processor utilizing a host memory in which the shape data are stored and the texture data are stored in a video memory that is utilized by the coprocessor for padding the macroblock.

15. A machine-readable medium storing machine instructions that cause a processor to perform the steps of claim 1.

16. A system for padding a boundary macroblock of a video object, comprising:
  (a) a graphics coprocessor;
  (b) a host processor in communication with the graphics processor, and
  (c) a host memory in communication with the host processor, said host memory storing shape data defining the video object, a boundary portion of which is associated with the macroblock, and said host memory storing machine instructions that cause the host processor to:
    (i) horizontally scan shape data for successive rows of the macroblock with the host processor to detect any transparent pixels and any opaque pixels contained in each row;
    (ii) at each occurrence of one or more transparent pixels in a row having at least one opaque pixel, detected while horizontally scanning the shape data, determine a horizontal primitive with the host processor, as a function of a number of successive transparent pixels detected in the row;
    (iii) communicate the horizontal primitive to the graphics coprocessor for horizontal padding of the row of the macroblock, as a function of texture data associated with one or more opaque pixels that are adjacent to said one or more transparent pixels, to produce horizontally padded pixels;
    (iv) for each row that includes only transparent pixels, determine a vertical primitive as a function of a number of adjacent rows that include only transparent pixels; and
    (v) communicate the vertical primitive to the coprocessor for vertical padding of the macroblock as a function of the texture data associated with pixels disposed in one or more adjacent rows, to produce a fully padded macroblock.

17. The system of claim 16, further comprising video memory in communication with the graphics coprocessor, said video memory storing texture data used to pad the macroblock.

18. The system of claim 16, further comprising a buffer in communication with the host processor and with the graphics coprocessor, said buffer temporarily storing vertical primitives determined by the host processor until a predefined latency period is surpassed, after which the vertical primitives are communicated to the graphics coprocessor.

19. The system of claim 16, further comprising a data bus providing communication from the host processor to the graphics coprocessor, said data bus conveying each horizontal primitive and each vertical primitive from the host processor to the graphics coprocessor.

20. The system of claim 19, wherein the data bus is one of an accelerated graphics port (AGP) bus and a peripheral component interconnect (PCI) bus.

* * * * *